United States Patent [19]
Shinozaki et al.

[11] Patent Number: 5,896,357
[45] Date of Patent: Apr. 20, 1999

[54] SHUTTER OPENING MECHANISM OF DATA RECORDING/REPRODUCING DEVICE

[75] Inventors: Shimpei Shinozaki, Tokyo; Akihiro Tanaka, Chiba-ken, both of Japan

[73] Assignee: Asahi Kogaku Kogyo Kabushiki Kaisha, Tokyo, Japan

[21] Appl. No.: 08/901,897

[22] Filed: Jul. 29, 1997

[30] Foreign Application Priority Data

Jul. 31, 1996 [JP] Japan ................... 8-201506

[51] Int. Cl.$^6$ .................................. G11B 17/04
[52] U.S. Cl. ............ 369/77.2; 360/99.02; 360/99.06
[58] Field of Search ................. 369/75.1–77.2; 402/27, 19; 411/508; 24/453, 297; 360/99.02, 99.06

[56] References Cited

U.S. PATENT DOCUMENTS

| | | | |
|---|---|---|---|
| 1,978,087 | 10/1934 | Johnson | 85/5 |
| 3,181,411 | 5/1965 | Mejlso | 85/5 |
| 3,232,160 | 2/1966 | Fork et al. | |
| 3,831,225 | 8/1974 | Bengtsson | 24/73 P |
| 5,126,899 | 6/1992 | Kanazawa | 360/99.07 |
| 5,307,703 | 5/1994 | Kurosawa | 74/89 |
| 5,511,736 | 4/1996 | Miura | 242/346 |
| 5,706,559 | 1/1998 | Oliver et al. | 24/297 |

FOREIGN PATENT DOCUMENTS 6-269322   9/1994   Japan.

*Primary Examiner*—William J Klimowicz
*Attorney, Agent, or Firm*—Greenblum & Bernstein P.L.C.

[57] ABSTRACT

A shutter opening mechanism in a data recording/reproducing device engages a shutter of a disk cartridge which is being inserted into the data recording/reproducing device to open the shutter as the disk cartridge is inserted. The opening mechanism includes a pin and a roller provided at an end of an arm. The pin is formed as a hollow cylinder that includes a slit along a length of the pin, and the roller is provided with a hole. During assembly, the pin is compressed to narrow the slit for insertion into the hole so that the roller is resiliently secured to the pin. Over time, the pin expands and ensures that the roller remains secured to the pin.

12 Claims, 4 Drawing Sheets

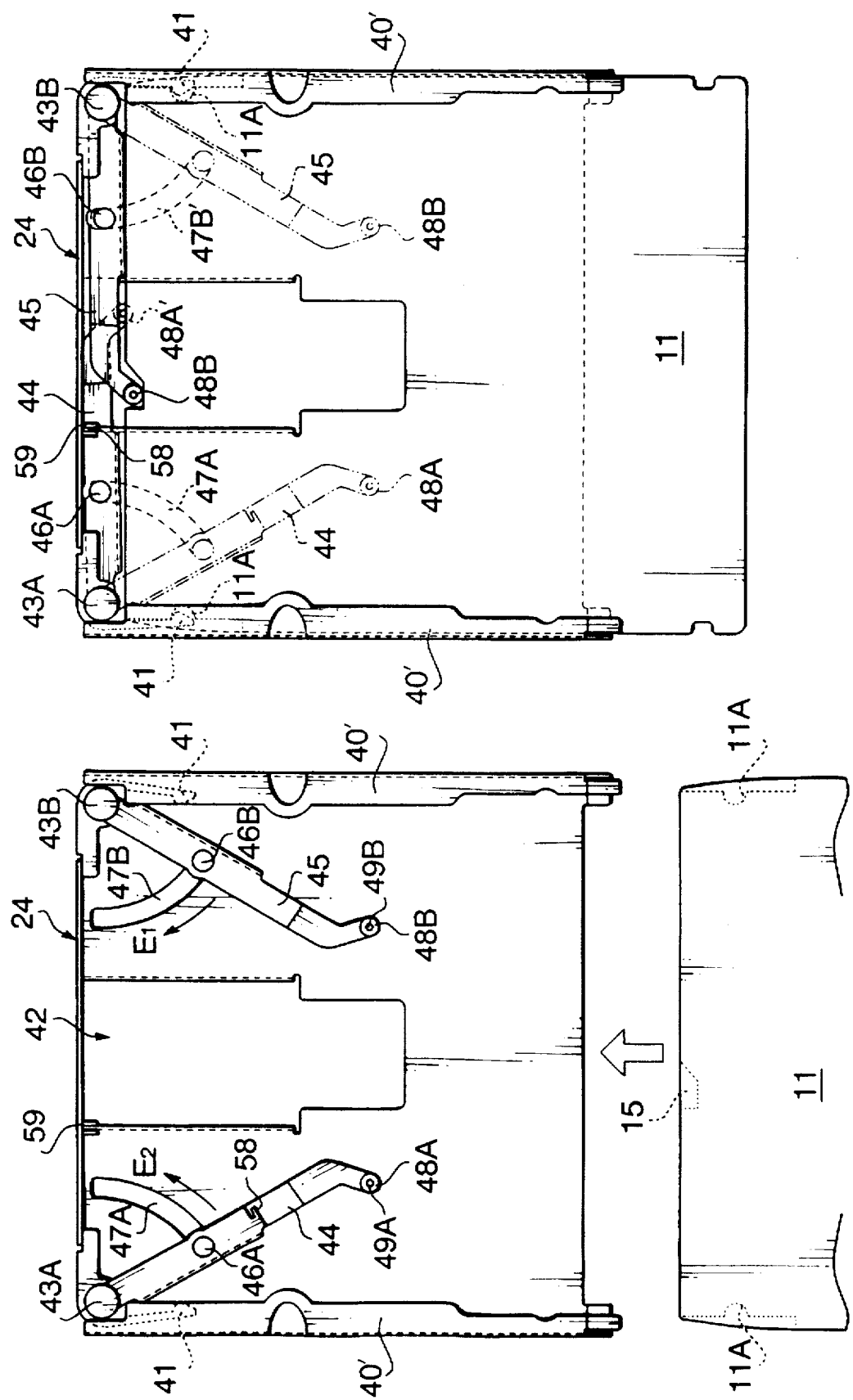

SHUTTER OPENING MECHANISM OF DATA RECORDING/REPRODUCING DEVICE

BACKGROUND OF THE INVENTION

The present invention relates to a shutter opening mechanism of a data recording/reproducing device and, more specifically, to a shutter opening mechanism used for opening a shutter of an optical disk which is inserted into the data recording/reproducing device.

A conventional data recording/reproducing device includes a cartridge holder that holds a disk cartridge and that is driven to load and unload the disk cartridge from the data recording/reproducing device.

FIG. 2 is a perspective view of a disk cartridge 11. The disk cartridge 11 includes a shutter 12, a head access window 13, and a motor access window 14. The shutter 12 includes a slot 15 and is biased by a spring (not shown) in a direction B. The disk cartridge 11 houses an optical disk 8 supported on a hub 9.

The cartridge holder conventionally includes an arm that engages with the slot 15 in order to open the shutter 12 as the disk cartridge 11 is loaded into the disk drive.

FIG. 1 is an exploded view of an end of a conventional arm 245. The end of the arm 245 includes a circular hole 245A. Two rollers 248A abut either side of the hole 245A. Each roller 248A also includes a circular hole 248B coaxially aligned with the hole 245A but having a radius that is slightly smaller than that of the hole 245A. A pin 249 is inserted through the holes 248B and the hole 245A. The pin 249 has a cylindrical shape with a radius that is smaller than the radius of the hole 245A, but marginally larger than that of the holes 248B. Accordingly, the pin 249 is forced into the holes 248B such that, after insertion, the rollers 248A remain in a fixed position in relation to the pin 249, but the pin 249 rotates in the hole 245A.

However, since the pin 249 is inserted into the holes 248B by force, the radius of the holes 248B may increase due to residual stress and friction during rotation of the pin 249 and rollers 248A. Consequently, the pin 249 may be released, such that the pin 249 and rollers 248A may fall off of the arm 245.

SUMMARY OF THE INVENTION

It is therefore an object of the present invention to provide an improved shutter opening mechanism of a data recording/reproducing device for opening a shutter of a disk cartridge which is inserted into the data recording/reproducing device.

According to one aspect of the invention, there is provided, a shutter opening device for opening a shutter of a disk cartridge. In particular, the shutter slidably opens or closes over a window formed on the disk cartridge. The shutter is formed with an engaging slit. Further, the shutter opening device is provided to a cartridge holder in which the disk cartridge and the shutter opening device includes an arm member having an end pivotably mounted on the cartridge holder, a roller member, and a hollow cylindrical pin. The pin has a slit along an axial direction thereof, that rotatably mounts the roller member on the arm member at a movable end (opposite to the pivotably mounted end). The arm member is arranged such that the roller member engages with the engaging slit of the shutter when the disk cartridge is inserted into the cartridge holder.

With this arrangement, the roller member engages with the engaging slit on the shutter, and the insertion of the disk cartridge causes the arm member to pivot such that the shutter is opened.

Further, since the pin is formed having a slit along an axial direction thereof, the pin is resilient. Once compressed, the pin will expand in relation to wear on the roller member to appropriately maintain the mounting of the roller member on the arm member.

In a particular case, the roller member has a hole in which the pin is fitted. A diameter of the hole is smaller than a diameter of the pin when the pin is in a neutral state.

In another particular case, the roller member includes a pair of rollers. Each roller has, at a rotational center thereof, a roller opening having a diameter which is smaller than a diameter of the pin. The movable end of the arm member is provided with an arm opening having a diameter greater than the diameter of the pin. The pin is inserted through the roller openings and the arm opening such that the arm member is positioned between the rollers, and the rollers are rotatably supported on the arm member.

According to a particular embodiment, the shutter opening device further includes a second arm member having an end pivotably mounted on the cartridge holder, a second roller member, and a second hollow cylindrical pin formed with a slit along an axial direction thereof. The second pin rotatably mounts the second roller member on the second arm member at a movable end, opposite to the pivotably mounted end. In this embodiment, the second roller member engages with a surface of the shutter when the disk cartridge is inserted into the cartridge holder to guide the shutter to open.

Further, the second roller member has a second hole in which the second pin is fitted. A diameter of the second hole is smaller than a diameter of the second pin when the second pin is in a neutral state.

In a particular case of this embodiment, the roller member and the second roller member may each include two cylindrical rollers, which are, for example, formed of resin or the like.

In another particular case of this embodiment, the arm and the second arm may be biased to push the disk cartridge in a direction opposite to an insertion direction.

In this case, the shutter opening device may further include a hook mechanism for holding the disk cartridge in a predetermined position. The hook mechanism engages when the disk cartridge is fully inserted.

In another particular case of this embodiment, the shutter opening device may further include a detector which detects that one of the arm and the second arm is located at a predetermined position. In particular, the predetermined position may be a position of the arm or the second arm when the disk cartridge is fully inserted. The detection may activate a loading process in which the cartridge holder is moved to a loaded position.

According to another aspect of the invention, there is provided, a cartridge holder that includes a shutter opening mechanism as described above.

BRIEF DESCRIPTION OF THE DRAWINGS

FIG. 4A is a bottom view of a cartridge holder as a disk cartridge is about to be inserted;

FIG. 4B is a bottom view of the cartridge holder wherein the disk cartridge has been inserted;

DETAILED DESCRIPTION OF THE PREFERRED EMBODIMENTS

An embodiment of a shutter opening mechanism of a data recording/reproducing device is described with reference to the figures.

Figure 3A:
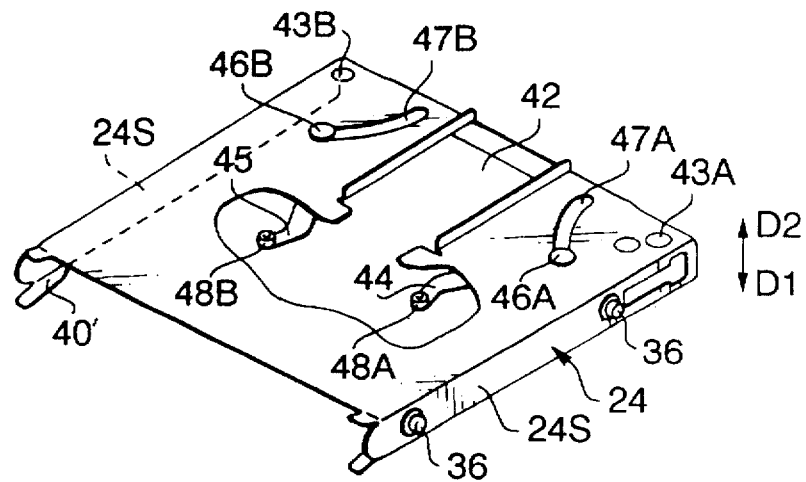
FIGS. 3A to 3C show components of a data recording/reproducing device to which an embodiment of the invention is applied.
Figure 3B:
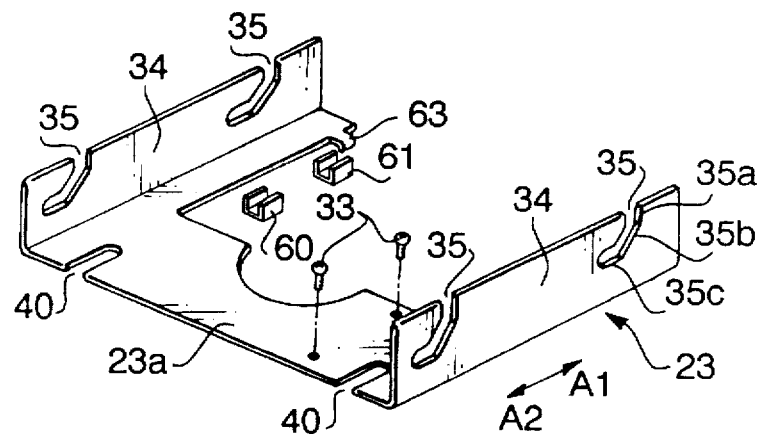
Figure 3C:
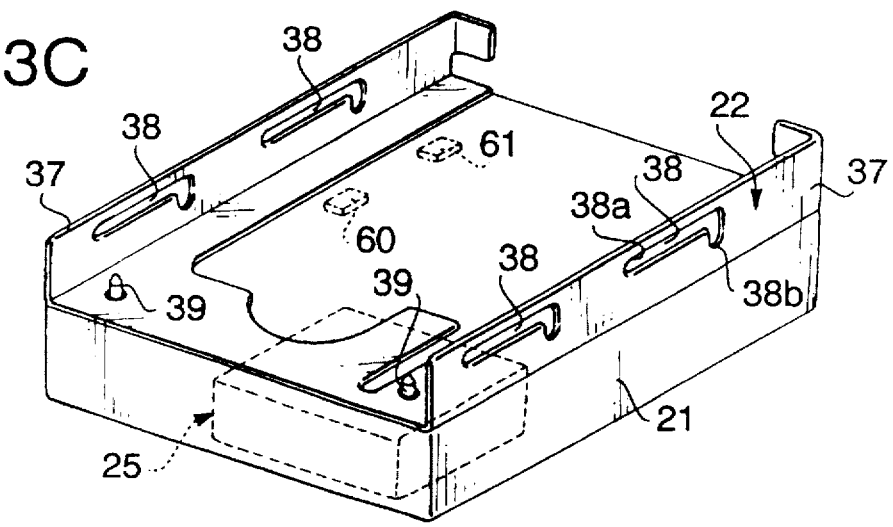

FIGS. 3A–3C show components of a data recording/reproducing device. FIG. 3A shows a cartridge holder 24, FIG. 3B shows a second cam plate 23, and FIG. 3C shows a base unit 21 and a first cam plate 22.

As shown in FIG. 3C, the base unit 21 houses a loading mechanism 25, described below, and is provided with two photointerrupters 60, 61 (also shown in FIG. 3B) for sensing a position of the second cam plate 23, as described in more detail below.

The first cam plate 22 is fixed on the base unit 21 and includes two side walls 37 each formed with two L-shaped cam grooves 38. The cam grooves 38 each include a horizontally extending portion 38a and a vertically extending portion 38b.

As shown in FIG. 3B, the second cam plate 23 is movable with respect to the first cam plate 22 in a direction A1-A2, and includes four cam grooves 35 formed on two side walls 34. The cam grooves 35 each include a vertically extending portion 35a, an inclined portion 35b, and a horizontally extending portion 35c.

As shown in FIG. 3A, the cartridge holder 24 includes four cam followers 36 protruding from side walls 24S. The engagement of the cam followers 36 with the cam grooves 35, 38 provides for movement of the cartridge holder 24 in a direction A1-A2 and also in a direction D1-D2 with respect to the base unit 21.

More particularly, the side walls 34 of the second cam plate 23 slidably contact the inner surfaces of the side walls 37 of the first cam plate 22, and the side walls 24S of the cartridge holder 24 slidably contact the inner surfaces of the side walls 34 of the second cam plate 23. The cam followers 36 slidably engage the cam grooves 35 of the second cam plate 23 and the cam grooves 38 of the first cam plate 22.

During movement of the second cam plate 23, a bent portion 63 of the second cam plate 23 moves between the photointerrupters 60 and 61 (shown in FIGS. 3B and 3C). When the bent portion 63 is located at the photointerrupter 60, the cartridge holder 24 is located at an unloading position. When the bent portion 63 is located at the photointerrupter 61, the cartridge holder 24 is located at a loaded position. Thus, based on the presence or absence of the bent portion 63, the photointerrupters 60, 61 output signals indicating whether the cartridge holder 24 is located at the unloading position, the loaded position, or a position therebetween.

Figure 1:
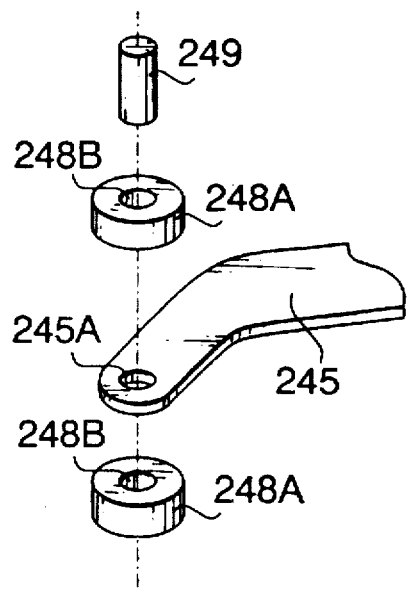
FIG. 1 is an exploded view of a conventional shutter opening mechanism.
Figure 2:
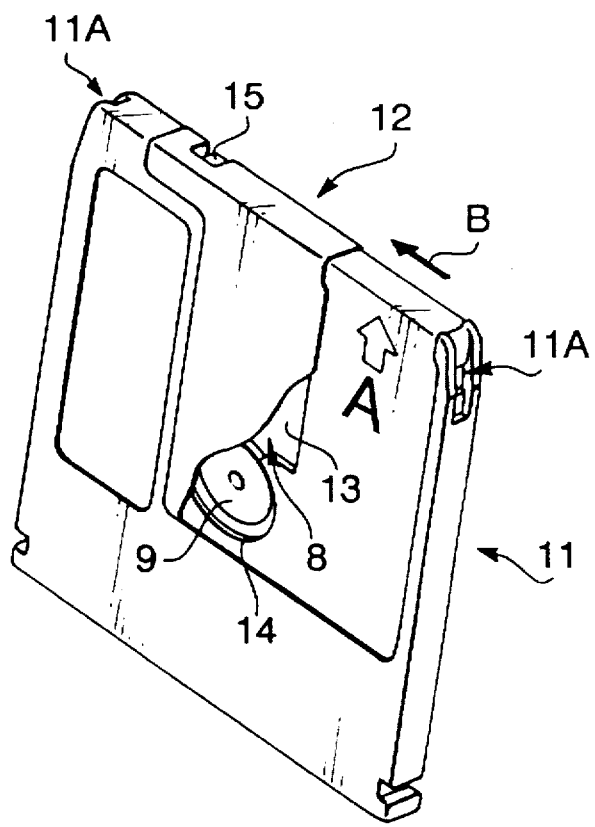
FIG. 2 is a perspective view of a disk cartridge.

The cartridge holder 24 is designed to hold a disk cartridge 11. As shown in FIG. 2, the disk cartridge 11 accommodates an optical disk 8, and includes a shutter 12, a head access window 13, a motor access window 14, and two locking grooves 11A. The optical disk 8 includes a hub 9. The shutter 12 is provided with a slit 15 biased in a direction B with a spring (not shown) in order to close over the head access window 13 and the motor access window 14 while in a neutral state.

FIG. 4A is a bottom view of the cartridge holder 24 as the disk cartridge 11 is about to be inserted. As shown in FIG. 4A, the cartridge holder 24 further includes an aperture 42, shafts 43A and 43B, rotation arms 44 and 45 which rotate about the shafts 43A and 43B, respectively, guide grooves 47A and 47B, and a photo interrupter 59. The guide grooves 47A and 47B each have an arc shape. The rotation arms 44 and 45 respectively include guide pins 46A and 46B that move through the corresponding guide grooves 47A and 47B to guide rotation arms 44 and 45 in directions E1 and E2, respectively. The rotation arms 44 and 45 are biased, by a spring (not shown) or the like, to rotate in a direction opposite to the directions E1 and E2 respectively.

The rotation arms 44 and 45 further include pins 49A and 49B and roller units 48A and 48B rotatably supported by the pins 49A and 49B, respectively.

FIG. 4B is a bottom view of the cartridge holder 24 illustrating the insertion of the disk cartridge 11. As shown in FIG. 4B, the cartridge holder 24 is also provided with guides 40' that guide the disk cartridge 11 into the cartridge holder 24. As the disk is inserted, one of the roller units 48A or 48B engages with the slit 15 on the inserted disk cartridge 11 and the other contacts a leading end surface of the disk cartridge 11. The two rotation arms 44 and 45 are provided so that the disk cartridge 11 can be inserted with either side up and are arranged such that the height of the rotation arms 44 and 45, and the height of the roller units 48A and 48B with respect to the upper surface of the cartridge holder 24, are differentiated so that, depending on which side of the disk cartridge 11 is up, one of the roller units 48A or 48B engages with the slit 15 of the disk cartridge 11. For example, if the disk cartridge 11 is inserted with a side A up, the roller unit 48B of the rotation arm 45 catches the slit 15 so that the shutter 12 is opened, and the roller unit 48A of the rotation arm 44 is pushed by the front surface of the shutter 12.

The cartridge holder 24 further includes two resilient retaining hooks 41 formed from, for example, plastic or the like. Hooks 41 are provided to each of the shafts 43A and 43B, such that, when the disk cartridge 11 is fully inserted into the cartridge holder 24, the retaining hooks 41 engage with the locking grooves 11A on the disk cartridge 11 to apply a predetermined force and hold the disk cartridge 11 in place in the cartridge holder 24.

Further, when the disk cartridge 11 is fully inserted into the cartridge holder 24, a shield protrusion 58 provided on the rotating arm 44 enters the path of the photointerrupter 59, and a cartridge-in signal is output from the photointerrupter 59.

Thus, as shown in FIG. 4B, when the disk cartridge 11 is completely inserted, the shutter 12 is completely opened, the disk cartridge 11 is secured in place by the retaining hooks 41, and the photointerrupter 59 outputs the cartridge-in signal which initiates driving of the driving unit 25.

Figure 5:
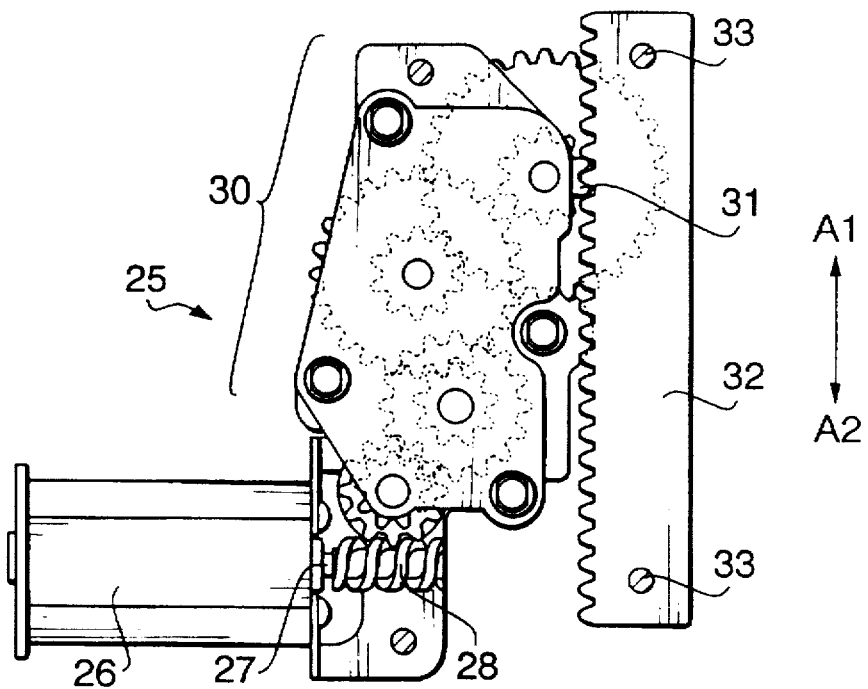
FIG. 5 is a plan view of a loading mechanism.

As shown in FIG. 5, the driving unit 25 includes a loading motor 26, an output shaft 27, a worm gear 28 secured to the output shaft 27, an intermediate gear train 30, a pinion 31 and a rack 32 engaged with the pinion 31. The rack 32 is attached to a bottom plate 23a of the second cam plate 23 by screws 33 (see FIG. 3B). When the loading motor 26 is driven, a driving force is transmitted from the worm gear 28, through the intermediate gear train 30, to the pinion 31, which drives the rack 32 to move the second cam plate 23 in the direction A1-A2 (see FIG. 3B) with respect to the base unit 21. As explained briefly above, a position of the cartridge holder 24 is defined by the cam grooves 38 and 35, and the cam followers 36 engaged therein, such that as the second cam plate 23 moves with respect to the first cam plate 22, the cartridge holder 24 also moves.

After the disk cartridge 11 has been fully inserted in the cartridge holder 24, as indicated by the cartridge-in signal from the photointerrupter 59, the loading motor 26 starts moving the cartridge holder 24 together with the disk cartridge 11 to the loaded position. Data can then be recorded on or reproduced from the disk 8.

More particularly, the loading motor 26 drives the rack 32 to move the cartridge holder 24 in the direction A1. Initially, the cam followers 36 are located at the horizontally extending portions 38a of the cam grooves 38, at an end opposite to the vertically extending portions 38b. When the loading motor 26 starts rotating, the second cam plate 23 starts moving in the direction A1. As the second cam plate 23 moves in the direction A1, the cam followers 36 are pushed by the vertically extending portions 35a of the cam grooves 35, and move in the direction A1 following the cam grooves 38. When the cam followers 36 reach the end of the horizontally extending portion 38a of the cam groove 28 along the direction A1, the cam followers 36 are then pushed by the inclined portions 35b of the cam grooves 35. They move downward, following the vertically extending cam grooves 38b in the direction D1, until reaching a bottom of the vertical portions 38b. At this point, the bent portion 63 of the second cam plate 23 is located in the path of the photointerrupter 61, and the photointerrupter 61 sends a signal that deactivates the loading unit 25 to indicate that the disk cartridge 11 is located at the loaded position.

When the disk cartridge 11 is to be ejected, as detected by, for example the activation of an eject switch (not shown) or the like, the loading motor 26 is driven in reverse such that the second cam plate 23 is moved in the direction A2. As the second cam plate 23 moves in the direction A2, the cam followers 36 are pushed by the inclined portions 35b of the cam grooves 35. Following the vertically extending portion 38b of the cam 38, the cam follower 36 ascends in a direction D2. Having reached the upper end of the vertically extending portion 38b, the cam follower 36 is pushed by the vertically extending portion 35a of the cam groove 35 and moves in the direction A2 following the horizontally extending portion 38a to an end thereof. At this point, the bent portion 63 of the second cam plate 23 is located at the photointerrupter 60 and the photointerrupter 60 sends a signal that deactivates the loading unit 25 to indicate that the disk cartridge 11 is located at the unloading position. In this state, the disk cartridge 11 may be extracted from the cartridge holder 24 by a user. As the disk cartridge 11 is removed, the shutter 12 closes due to the bias forces applied to the arms 44 and 45 and the shutter 12 (described above), respectively.

The pins 49A and 49B and the roller units 48A and 48B that engage with the shutter 12 are now described in more detail. Since the pin 49A and the roller unit 48A are substantially identical to the pin 49B and the roller unit 48B, respectively, the pin 49B and the roller unit 48B provided to the arm 45 will be used as an example.

Figure 6:
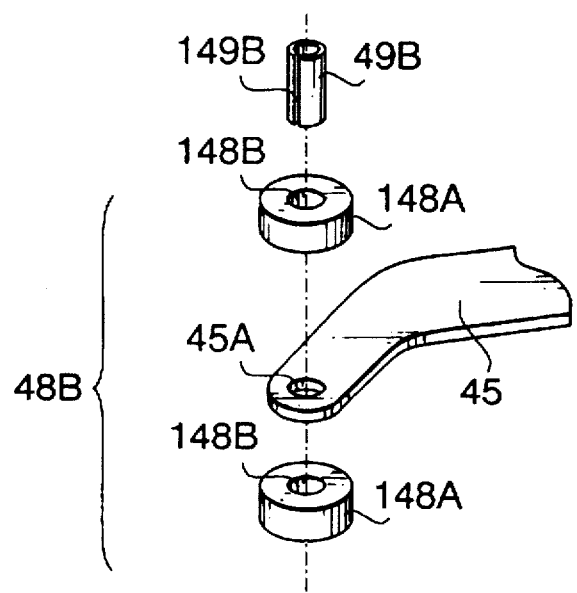
FIG. 6 is an exploded view of a shutter opening mechanism according to an embodiment of the present invention.

As shown in FIG. 6, the end of the arm 45 includes a circular hole 45A. The roller unit 48B includes two rollers 148A that abut either side of the hole 45A. Each roller 148A is, for example, made of a synthetic resin or the like, and includes a circular hole 148B having a radius that is slightly smaller than that of the hole 45A. The pin 49B is a hollow cylinder having a slit 149B extending axially along a side thereof. In a neutral state, the pin 49B has a radius that is larger than that of the holes 148B. Further, although not required, in this embodiment, the radius of the pin 49b is also smaller than that of the hole 45A on the arm 45.

As shown in FIG. 6, during assembly, the two rollers 148A are placed on opposite sides of the arm 45 such that the holes 148B are coaxially aligned with the hole 45A. The pin 49B is inserted through the holes 148B of the rollers 148A and the hole 45A of the arm 45. In this process, the pin 49B is compressed so that the slit 149B narrows and the pin 49B can be easily inserted into the holes 148B and 45A. Further, since the hole 45A has a slightly smaller radius than the holes 148B, after insertion, the pin 49B expands and contacts the holes 148B while remaining freely rotatable in the hole 45A. Thus, the rollers 148A are securely and rotatably supported on the arm 45.

Further, even if the radii of the holes 148B gradually enlarge due to wear or residual stress, the pin 49B expands resiliently to maintain contact with the holes 148B from inside. Accordingly, the pin 49B is less likely to be dislodged from the rollers 148A.

Of course, other arrangements of the pin 49B are possible as long as the pin 49B is designed to expand resiliently in a radial direction. Thus, preferably the pin 49B is formed as an elastic body.

Although the structure and operation of a shutter opening mechanism is described herein with respect to a preferred embodiment, many modifications and changes can be made without departing from the spirit and scope of the invention.

The present disclosure relates to subject matter contained in Japanese Patent Application No. HEI 8-201506, filed on Jul. 31, 1996, which is expressly incorporated herein by reference in its entirety.

What is claimed is:

1. A shutter opening device for opening a shutter of a disk cartridge, said shutter opening device being provided in a cartridge holder in which said disk cartridge is to be inserted, said shutter slidably opening or closing over a window formed on said disk cartridge and being formed with an engaging slit, said shutter opening device comprising:

an arm member having an end pivotably mounted on said cartridge holder;

a roller member, said roller member including a pair of rollers; and a hollow cylindrical pin formed with a slit along an axial direction of said pin, each roller having, at a rotational center, a roller opening having a diameter which is smaller than a diameter of said hollow cylindrical pin;

wherein said hollow cylindrical pin rotatably mounts said roller member on said arm member at a movable end, opposite said pivotably mounted end, said roller member engaging said engaging slit of said shutter when said disk cartridge is inserted into said cartridge holder;

said movable end of said arm member having an arm opening having a diameter greater than the diameter of said hollow cylindrical pin;

said pin extending through said roller openings of said pair of rollers and through said arm opening such that said arm member is positioned between said pair of rollers, and said pair of rollers are rotatably supported on said arm member.

2. The shutter opening device according to claim 1, further comprising:

a second arm member having an end pivotably mounted on said cartridge holder;

a second roller member, said second roller member including a second pair of rollers; and a second hollow cylindrical pin formed with a slit along an axial direction of said second hollow cylindrical pin, each roller of said second roller member having, at a rotational center, a roller opening having a diameter which is smaller than a diameter of said second hollow cylindrical pin, a movable end of said second arm member having an arm opening having a diameter greater than the diameter of said second hollow cylindrical pin;

wherein said second hollow cylindrical pin rotatably mounts said second roller member on said second arm member at said movable end, opposite said pivotably mounted end, said second roller member contacting an end surface of said disk cartridge when said disk cartridge is inserted into said cartridge holder and said second hollow cylindrical pin extending through said roller openings of said second pair of rollers and through said second arm opening such that said second arm member is positioned between said second pair of rollers, and said second pair of rollers are rotatably supported on said second arm member.

3. The shutter opening device according to claim 2, wherein said roller member and second roller member are formed of resin.

4. The shutter opening device according to claim 2, wherein said arm member and said second arm member are biased to contact said disk cartridge in a direction opposite to an insertion direction.

5. The shutter opening device according to claim 4, further comprising:

a hook mechanism for holding said disk cartridge in a predetermined position, wherein said hook mechanism engages said disk cartridge when said disk cartridge is fully inserted.

6. The shutter opening device according to claim 2, further comprising:

a detector which detects that one of said arm member and said second arm member is located at a predetermined position.

7. The shutter opening device according to claim 6, wherein said predetermined position is a position of said arm member or said second arm member when said disk cartridge is fully inserted, and wherein said detector activates a loading process in which said cartridge holder is moved to a loaded position.

8. The shutter opening device according to claim 1, substantially an entire circumferential surface of said roller opening contacting said pin.

9. A cartridge holder having a shutter opening device for opening a shutter of a disk cartridge, said shutter opening device provided in said cartridge holder in which said disk cartridge is inserted, said shutter slidably opening or closing over a window formed on said disk cartridge and having an engaging slit, said shutter opening device comprising:

an arm member having an end pivotably mounted on said cartridge holder;

a roller member; and a hollow cylindrical pin formed with a slit passing through a wall of said hollow cylindrical pin and extending along an axial direction;

said roller member having, at a rotational center, a roller opening having a diameter which is smaller than a diameter of said pin, said movable end of an arm member having an arm opening having a diameter greater than the diameter of said pin;

wherein said pin rotatably mounts said roller member on said arm member at said movable end, opposite said pivotably mounted end, said roller member engaging with said engaging slit of said shutter when said disk cartridge is inserted into said cartridge holder, said pin extending through said roller opening of said roller member and through said arm opening such that said roller member is rotatably supported on said arm member.

10. The cartridge holder according to claim 9, substantially an entire circumferential surface of said roller opening contacting said pin.

11. A shutter opening device for opening a shutter of a disk cartridge, said disk cartridge being insertable in a disk cartridge holder, said shutter opening device comprising:

an arm member, said arm member having an end pivotably mounted on the disk cartridge holder;

a roller member;

a hollow cylindrical pin with a slit passing through a wall of said hollow cylindrical pin, said slit extending along an axial direction of said hollow cylindrical pin;

an opening formed at a rotational center of said roller member, said opening having a diameter smaller than an outer diameter of said hollow cylindrical pin;

said arm member including a free end provided with an opening, said opening of said arm member having a diameter greater than the outer diameter of said hollow cylindrical pin;

said hollow cylindrical pin extending through said opening of said roller member and through said arm opening such that said arm member rotatably supports said roller member.

12. The shutter opening device according to claim 11, substantially an entire circumferential surface of said opening of said roller member contacting said pin.

* * * * *